United States Patent [19]
Dorfschmid et al.

[11] Patent Number: 5,875,866
[45] Date of Patent: Mar. 2, 1999

[54] CONTROLLING MECHANISM FOR OPERATING A GEAR-SHIFT-LEVER SHIFT OF A GEARBOX FOR MOTOR VEHICLES

[75] Inventors: Jens Dorfschmid, Schonungen; Lutz Leimbach, Grafenrheinfeld, both of Germany

[73] Assignee: Fichtel & Sachs AG, Schweinfurt, Germany

[21] Appl. No.: 721,247

[22] Filed: Sep. 26, 1996

[30] Foreign Application Priority Data

Sep. 26, 1995 [DE] Germany ............ 195 35 755.8

[51] Int. Cl.$^6$ ................................. B60K 26/00
[52] U.S. Cl. .................. 180/315; 180/336; 74/473.11
[58] Field of Search ................. 180/315, 336; 74/473.11

[56] References Cited

U.S. PATENT DOCUMENTS

| | | | |
|---|---|---|---|
| 3,991,845 | 11/1976 | LaPointe | 180/336 |
| 4,271,728 | 6/1981 | Wakamatsu | 74/473.11 |
| 4,666,023 | 5/1987 | Achberger et al. | 74/473.1 |
| 5,560,248 | 10/1996 | Devand et al. | 74/473.11 X |

FOREIGN PATENT DOCUMENTS

| | | |
|---|---|---|
| 2670265 | 6/1992 | France . |
| 2124624 | 12/1972 | Germany . |
| 4309027 | 9/1994 | Germany . |
| 4311855 | 10/1994 | Germany . |
| 1544605 | 4/1979 | United Kingdom . |
| 9004122 | 4/1990 | WIPO . |

*Primary Examiner*—Christopher P. Ellis
*Attorney, Agent, or Firm*—Cohen, Pontani, Lieberman & Pavane

[57] ABSTRACT

A controlling mechanism, particularly for operating a gear-shift-lever shaft of a gearbox for motor vehicles, having controlling units for introducing a sensor-monitorable rotational or translational movement to the gear-shift-lever shaft. A first controlling unit is connected to a second controlling unit and the first controlling unit can in turn be brought into active connection with the gear-shift-lever shaft via at least one articulation.

14 Claims, 3 Drawing Sheets

CONTROLLING MECHANISM FOR OPERATING A GEAR-SHIFT-LEVER SHIFT OF A GEARBOX FOR MOTOR VEHICLES

BACKGROUND OF THE INVENTION

1. Field of the Invention

The invention relates to a controlling mechanism, particularly for operating a gear-shift-lever shaft of a gearbox for motor vehicles.

2. Description of the Prior Art

A controlling mechanism for operating a gear-shift-lever shaft of a gearbox for motor vehicles is already known, e.g., from DE 43 09 027 A1. The known controlling mechanism comprises a gear-shift-lever shaft, a guide piston and a ring piston, a take-along element and two controlling units in the form of hydraulic systems, which can be used to control the rotational and translational movement of the gear-shift-lever shaft. The translational movement of the gear-shift-lever shaft is controlled by a guide piston, which upon appropriate pressurization carries out a translational movement by means of a double-action cylinder. A ring piston is connected via helical teeth to a take-along element, which in turn is connected on one side via longitudinal teeth to the gear-shift-lever shaft. Upon pressurization, this ring piston is moved axially against the force of a return spring. As a result, the gear-shift-lever shaft, because of the helical teeth, carries out a rotational movement.

For the purpose of gear recognition, there are two integrated sensors. The first sensor, which is arranged at the bottom end of the take-along element, detects the rotational movement. The second sensor, which is arranged in the area of the two-chamber hydraulic system, detects the translational movement.

This control mechanism is disadvantageous in that the two hydraulic systems are arranged axially one behind the other in a radially outward fashion around the gear-shift-lever shaft, making a long gear-shift-lever shaft inevitable. Furthermore, because of the hydraulic chamber arrangement, it is necessary to use complicated parts to transmit the translational and rotational movements to the gear-shift-lever shaft.

SUMMARY OF THE INVENTION

Accordingly, it is an object of the present invention to provide a controlling mechanism that is more compact than prior mechanisms and consists of easily manufacturable parts.

Pursuant to this object, and others which will become apparent hereafter, one aspect of the present invention resides in a controlling mechanism in which the rotational and translational movements of the gear-shift-lever shaft are controlled by two controlling units. One of the controlling units being configured to be brought into active contact with the gear-shift-lever shaft by means of at least one articulation. The use of an articulation has the advantage of allowing active connections with multiple degrees of freedom to be established. In one embodiment of the controlling units, hydraulic cylinders are used. However, other types of the controlling units, e.g., of the electric motor type, are also conceivable.

In another embodiment of the invention one of the articulations includes a spherical joint, which encompasses a spherical-joint rod with a spherical end as well as a guidance element with a joint socket for the spherical end. This embodiment allows the transmission of a rotational movement around a rotational axis that is arranged at an angle to the driven (first) rotational axis.

In still a further embodiment of the invention the controlling units are arranged axis-parallel to the gear-shift-lever shaft. This arrangement allows the controlling device to be produced in the form of a compact component. Compact size is becoming ever more significant as the available structural space in motor vehicles becomes more and more limited. The compactness of the inventive controlling mechanism permits the controlling unit to be used even in motor vehicles where it previously could not be used for reasons of space.

Yet another embodiment provides that both controlling units are drivable for translational movements. Such controlling units are economically available in the form of standard hydraulic cylinders. It is thus possible to use standard parts, which helps reduce overall production costs of the controlling mechanism.

In an additional embodiment of the invention the rotational movement is transmitted to the gear-shift-lever shaft as follows. The rotational movement is introduced by a controlling unit, which can be driven for the purpose of a translational movement. This translational movement acts upon an articulation, which itself can be brought, via a rocker lever and a further articulation, into turn-proof engagement with the gear-shift-lever shaft. The rotational movement of the rocker lever is transmitted to the gear-shift-lever shaft via the second joint, the guidance element of which is embodied in the form of a take-along element. This take-along element is axially secured, and a guidance sleeve attached to the gear-shift-lever shaft is movable relative to the take-along element. The take-along element is connected in a turn-proof fashion to the guidance sleeve via a groove. The guidance sleeve itself is fixedly connected to the gear-shift-lever shaft. In this design, the rotational movement is transmitted to the gear-shift-lever shaft via the take-along element, and the translation-movement freedom of the gear-shift-lever shaft in the axial direction is maintained.

In another embodiment the gear recognition is carried out using a sensor that is connected to the gear-shift-lever shaft via an articulation. The rotational movements as well as the translational movements of the gear-shift-lever shaft are detected via this articulation. A sensor that performs this task is known, for example, from P 38 36 145.0.

A further embodiment of the invention arranges the sensor, like the controlling units, axis-parallel to the gear-shift-lever shaft axis. This means that the aforementioned advantages of the axis-parallel arrangement, such as compactness and technical production benefits, apply in this embodiment.

In an additional embodiment of the controlling mechanism, the controlling unit is connected to a transmission and can be brought into active connection with the gear-shift-lever shaft via an articulation. In this way the rotational and translational movements can be transmitted to the gear-shift-lever shaft in an out-of-phase manner. This makes it possible to dispense with a controlling unit.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
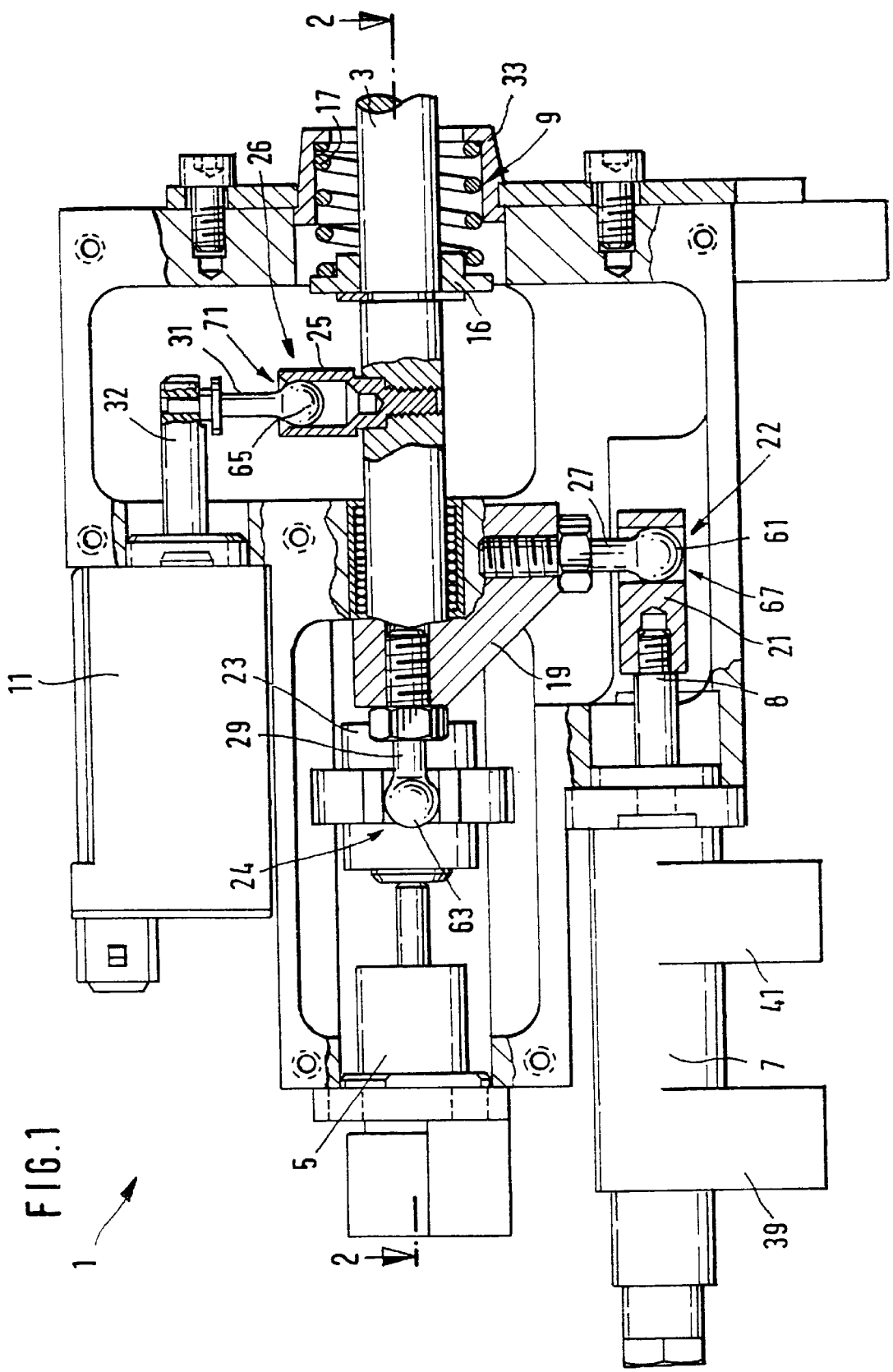
FIG. 1 is a section through a controlling mechanism pursuant to the present invention.
Figure 2:
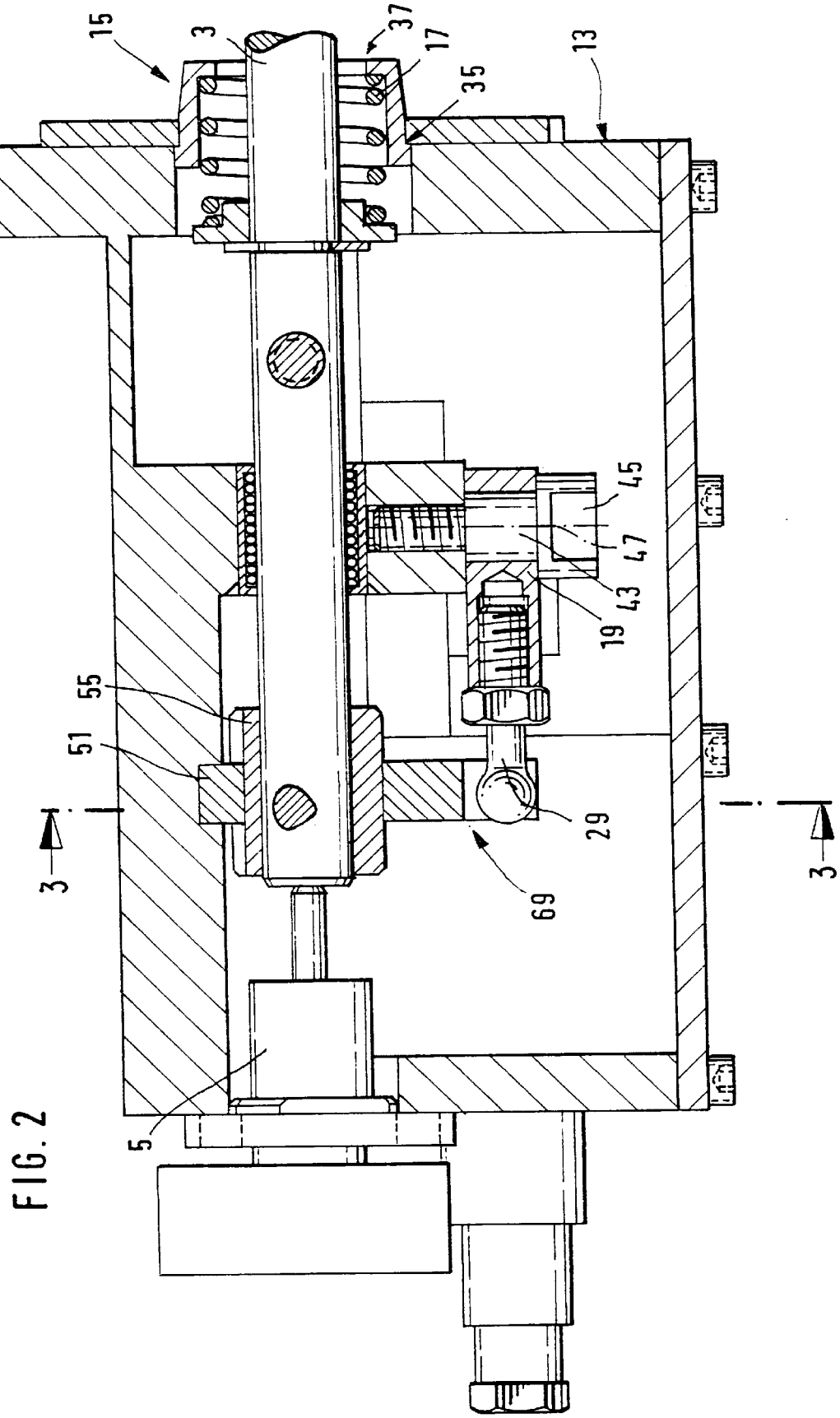
FIG. 2 is a section through the controlling mechanism in FIG. 1 along the line A—A.
Figure 3:
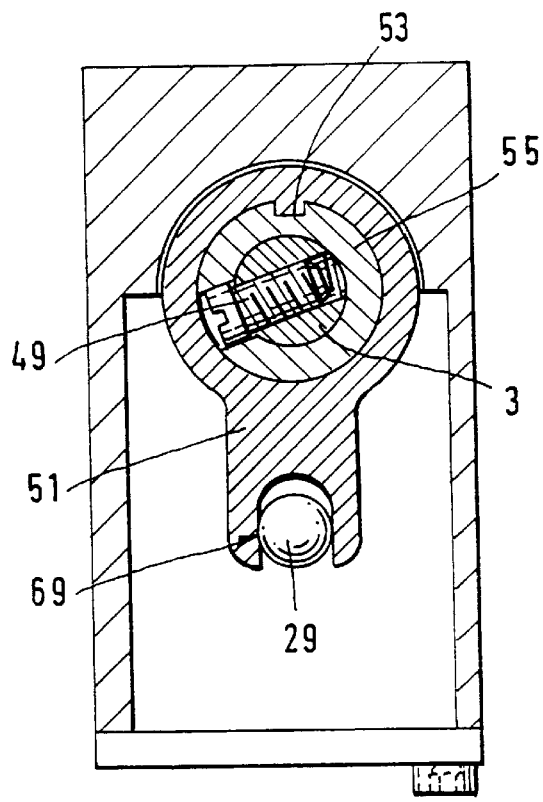
FIG. 3 is a section through the take-along element along line B—B in FIG. 2.
Figure 4:
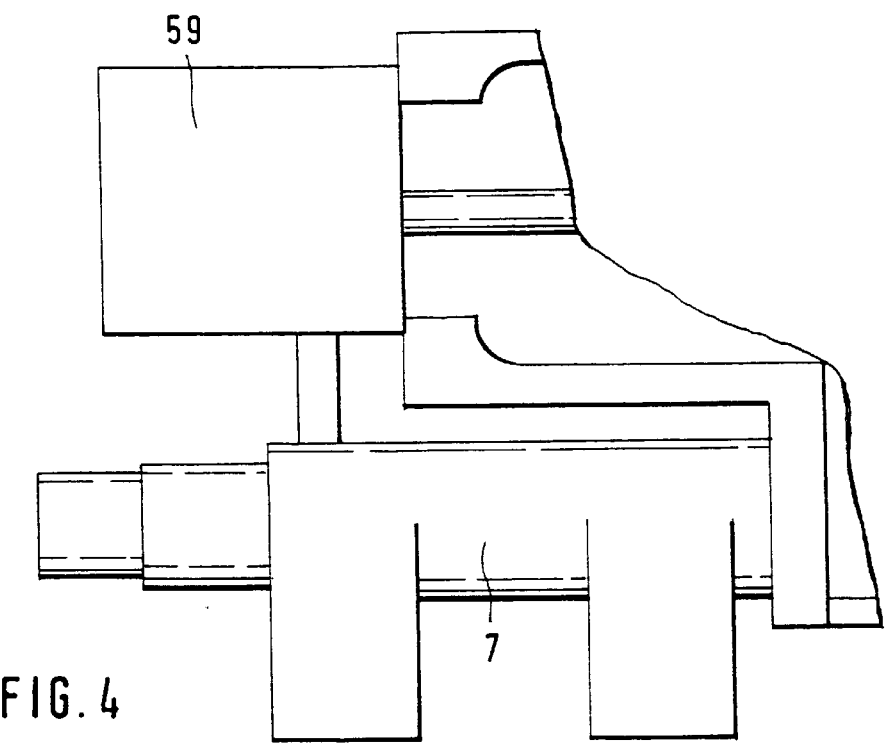
FIG. 4 is a section of a controlling mechanism with a transmission.

The fundamental structure of the inventive controlling mechanism is explained with reference to FIG. 1. The controlling mechanism 1 in FIG. 1 comprises a gear-shift-lever shaft 3, two control cylinders (first (7) and second (5) control means) 5, 7, a return spring 9, and a rocker lever 19 as well as several articulation means including spherical joints 22, consisting of spherical-joint rods 27, 29, 31 and guide elements 21, 23, 25.

The passageway is adjustable by a translation of the gear-shift-lever shaft 3 along its longitudinal axis, while the gear is selectable by a rotation of the gear-shift-lever shaft 3 around its longitudinal axis. However, which specific movements (translation, rotation) serve to select the passageway and gear depends on the specific transmission 59.

The movement of the gear-shift-lever shaft 3 is controlled via the two hydraulic cylinders 5, 7, whereby the rotational movement can be introduced via a double-action hydraulic cylinder 7 with the ports 39, 41 and the translational movement can be introduced via a single-action hydraulic cylinder 5.

The transmission of the rotational movement to the gear-shift-lever shaft 3 is next described. The hydraulic cylinder 7 is pressurized so that the cylinder end 8 moves along its longitudinal axis. To the cylinder end 8 is connected to the first guide element 21, which guides the spherical end 61 of the spherical-joint rod 27 in a joint socket 67. This spherical-joint rod 27 is arranged at almost a right angle to the hydraulic cylinder 7 and is fixedly connected at its end opposite the spherical end 61 to the rocker lever 19. Another spherical-joint rod 29 is connected to the rocker lever 19 in the same manner. This rod 29 is arranged at a right angle to the spherical-joint rod 27 and is thus almost parallel to the gear-shift-lever shaft 3. By means of bearing bolt(s) 43, the rocker lever 19 is mounted in a bearing 45 so as to be rotatable around the axis 47. The spherical end 63 of the spherical-joint rod 29 is connected via the joint socket 69 to the second guide element 23, which in this case also constitutes a take-along element 51. The take-along element 51 itself is axially secured and is connected to a guide sleeve 55 in a rotation-proof manner via a groove 53 in the guide sleeve 55. The guide sleeve 55 is fixedly connected to the gear-shift-lever shaft 3 by a bolt 49. By translation of the control cylinder 7, the axial movement is converted into a rotational movement via the rocker lever 19 with the two spherical-joint rods 27, 29. The second guide element 23, which is fixedly connected to the gear-shift-lever shaft 3, diverts the rotation around the rotational axis 47 into a rotation around the longitudinal axis of the gear-shift-lever shaft 3. In the illustrated embodiment, all articulations or swivel connections are established by means of the spherical joints 22, 24, 26. The right-angular arrangement of the joint rods 27, 29 and the guide elements 21, 23 permits the rotational movements to be transmitted almost free of lateral forces.

The single-action hydraulic cylinder 5 is arranged axially relative to the gear-shift-lever shaft 3, and the return spring element 9 associated with the cylinder 5 is located in the cover area 15 of the controlling mechanism 1.

The return spring element 9 itself encompasses a spring plate 16, a spring 17 and a hollow cylinder 33, which at one end has a projection 35 directed radially outward and at the other end has a projection 37 directly radially inward. The radially-outward projection 35 is used to attach the hollow cylinder 33 to the housing 13 of the controlling mechanism 1. The spring 17 is held between the radially-inward projection 37 and the spring plate 16, which is connected fixedly to the gear-shift-lever shaft 3.

Upon pressurization, the hydraulic cylinder 5 transmits a translation movement, against a return force of the return spring element 9, to the gear-shift-lever shaft 3. When the hydraulic cylinder 5 is arranged axis-parallel to the gear-shift-lever shaft 3, the translational movement that starts from the cylinder 5 is transmitted to the gear-shift-lever shaft 3 via a rotary plate.

When there is hydraulic control of the controlling unit 1, it is possible to integrate a ventilation system for the hydraulic system. After the hydraulic system has been filled, the ventilation system is used to extract the remaining air from the hydraulic system. In one possible design of the ventilation system, a non-return valve is integrated in the piston of the double-action cylinder 7, a pressure-limiting valve is integrated in the cylinder housing and, in addition, a hydraulic connection is established between the hydraulic cylinders. To achieve ventilation, the hydraulic system is pressurized at a pressure higher than the operating pressure. As a result, hydraulic fluid flows in one direction through all of the hydraulic chambers, and the remaining air is thus extracted.

Furthermore, a sensor 11, which is arranged parallel to the gear-shift-lever shaft axis, is connected to the gear-shift-lever shaft 3 via the spherical joint 26. The third guide element 25 is thereby frictionally connected to the gear-shift-lever shaft 3. The spherical end 65 of the spherical-joint rod 31 is connected via a joint socket 71 to the third guide element 25. The spherical-joint rod 31 is held by a connecting element 32, which is connected to the sensor 11 and runs parallel to the gear-shift-lever shaft 3. The rotation and translation movements of the gear-shift-lever shaft 3 pass via the spherical joint 26 to the connection element 32. In turn, the movements of the connection element 32 are picked up by the sensor 11 for the purpose of gear recognition.

The invention is not limited by the embodiments described above which are presented as examples only but can be modified in various ways within the scope of protection defined by the appended patent claims.

We claim:

1. A controlling mechanism for operating a gear-shift-lever shaft of a motor vehicle gearbox, comprising: first controlling means for introducing one of a sensor-monitorable rotational and translational movement to the gear-shift-lever shaft; second controlling means for introducing the other of the rotational and translational movement not introduced by the first controlling means, the first controlling means being connected to the second controlling means; and, articulation means for actively connecting the first controlling means to the gear-shift-lever shaft.

2. A controlling mechanism as defined in claim 1, wherein the articulation means includes a spherical joint formed of a joint rod connectable to the gear-shift-lever shaft and having a spherical end, and a guide element having a joint socket formed therein for receiving the spherical end.

3. A controlling mechanism as defined in claim 1, wherein both controlling means are arranged axis-parallel to the gear-shift-lever shaft.

4. A controlling mechanism as defined in claim 1, wherein both controlling means are configured to be drivable for translational movements.

5. A controlling mechanism as defined in claim 1, wherein the articulation means includes a first swivel connection, one of the controlling means being configured to act via a translational movement on the first swivel connection, and further comprising a rocker lever and a second swivel connection arranged so that the first swivel connection is engagable with the gear-shift-lever shaft in a rotation-proof manner.

6. A controlling mechanism as defined in claim 5, and further comprising a guide sleeve arrangable on the gear-shift-lever shaft, and an axially fixed take-along element, relative to which the guide sleeve can be moved, arranged to frictionally connect the second swivel connection to the gear-shaft-lever in a rotation-proof manner.

7. A controlling mechanism as defined in claim 6, wherein the take-along element is configured and arranged to surround the guide sleeve, the guide sleeve having a groove into which the take-along element engages in a rotation-proof manner, and further comprising means for connecting the guide sleeve to the gear-shift-lever shaft.

8. A controlling mechanism as defined in claim 1, and further comprising sensor means for gear recognition, and still further comprising further articulation means for connecting the sensor means to the gear-shift-lever shaft.

9. A controlling mechanism as defined in claim 8, wherein the sensor means is operative to detect rotational and translational movements of the gear-shift-lever shaft.

10. A controlling mechanism as defined in claim 8, wherein the sensor means includes articulation means frictionally connected to the gear-shift-lever shaft so that the sensor means picks up movements of the gear-shift-lever shaft.

11. A controlling mechanism as defined in claim 8, wherein both controlling means are arranged axis-parallel to the gear-shift-lever shaft, and further comprising a connecting element arranged to connect the sensor means to the further articulation means.

12. A controlling mechanism as defined in claim 1, and further comprising transmission means for transmitting the translational and rotational movements to the gear-shift-lever shaft in an out-of-phase fashion.

13. A controlling mechanism, for operating a gear-shift-lever shaft of a motor vehicle gearbox, comprising: at least one controlling unit operative to introduce a sensor-monitorable rotational and translational movement to the gear-shift-lever shaft; a transmission connected to the at least one controlling unit and the gear-shift-lever shaft; and at least one articulation configured to operatively connect the at least one controlling unit with the gear-shift-lever shaft, the controlling unit being axis-parallel to the gear-shift-lever shaft.

14. A controlling mechanism as defined in claim 13, wherein the transmission is operative to transmit the rotational and translation movements to the gear-shift-lever shaft in an out-of-phase fashion.

* * * * *